Jan. 28, 1969         D. A. J. DAVIS         3,423,814
                    ASSEMBLY APPARATUS
Filed March 24, 1966                    Sheet 1 of 2
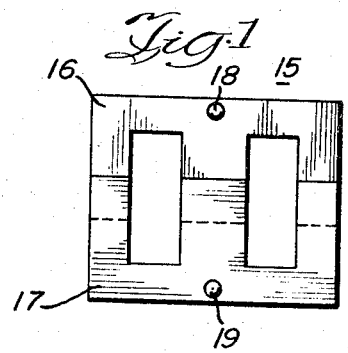
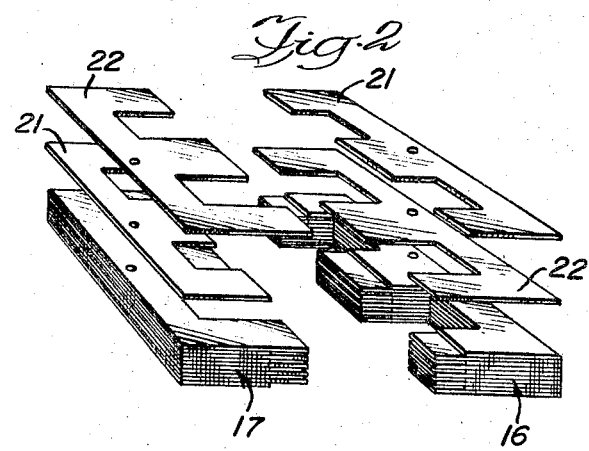
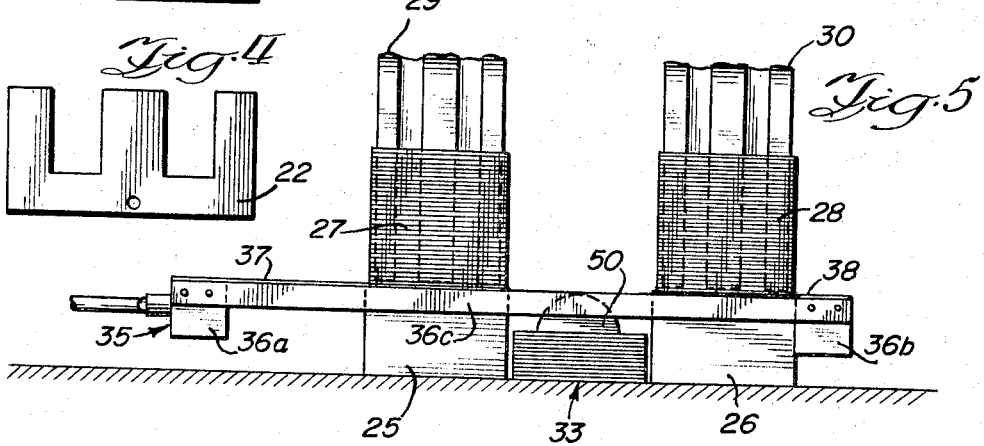
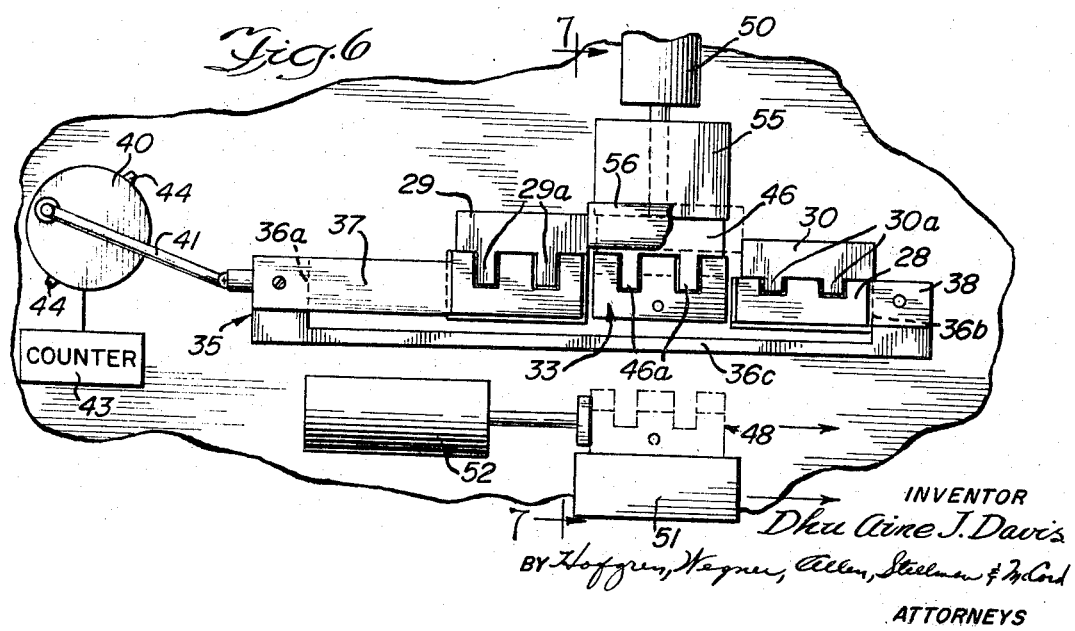
INVENTOR
Dhu Aine J. Davis
BY Hofgren, Wegner, Allen, Stellman & McCord
ATTORNEYS

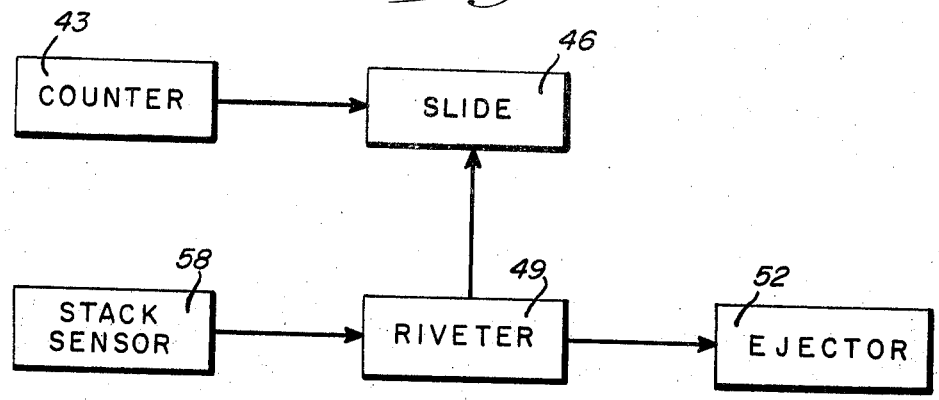
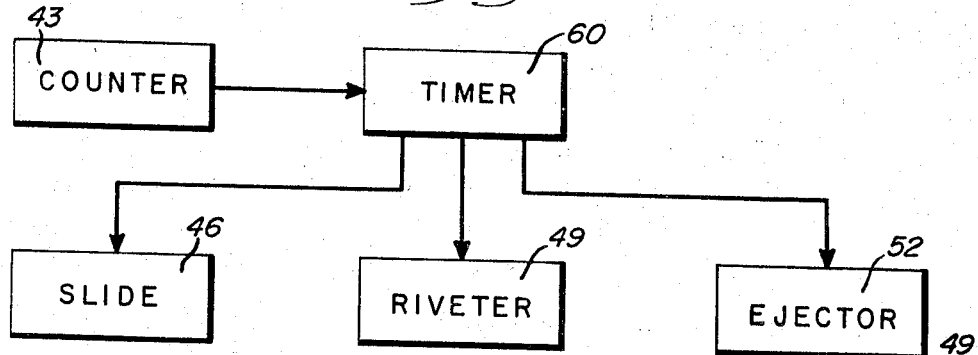
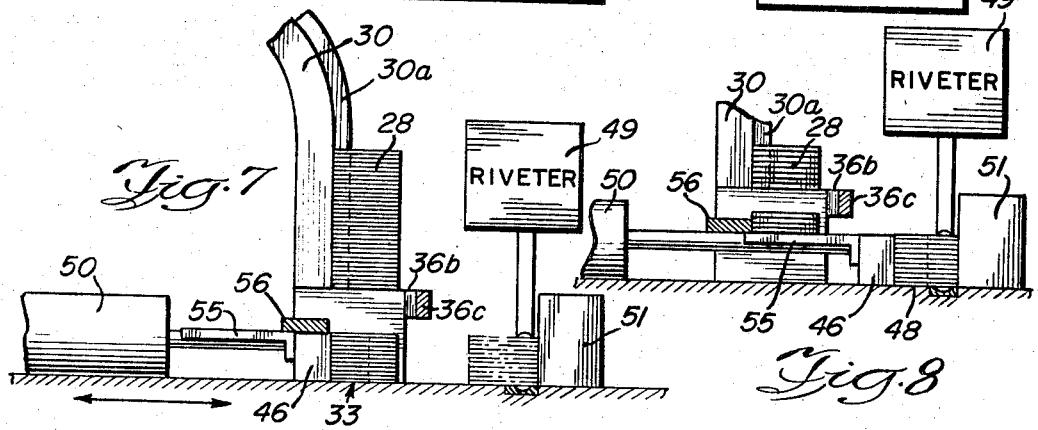

United States Patent Office 3,423,814
Patented Jan. 28, 1969

3,423,814
ASSEMBLY APPARATUS
Dhu Aine J. Davis, Wheaton, Ill., assignor to Hermetic Coil Co., Inc., a corporation of Connecticut
Filed Mar. 24, 1966, Ser. No. 537,083
U.S. Cl. 29—203         5 Claims
Int. Cl. B33q 7/08; H01r 43/00; B23q 7/06

ABSTRACT OF THE DISCLOSURE

A machine for stacking core laminations of two different configurations in which the laminations are alternately selected from two stacks of laminations. A reciprocating shuttle selects the laminations alternately from each stack and transfers them to a central assembly position. A slide member moves transversely of the direction of reciprocation of the shuttle and moves the assembled stack of laminations from the assembly position to a fastening position for fastening the transferred stack of laminations together.

---

This invention relates to a machine for stacking the laminations of a core for an inductor device and more particularly for stacking alternate laminations of two different configurations. Laminated cores for inductors often have two pieces, as with a double E or an E–I configuration. Where the adjoining ends of the core portions are interleaved, it is necessary to assemble each core portion from laminations with two different configurations. This has been done in the past by hand assembly which is slow, expensive and subject to error in the number and arrangement of the laminations.

One feature of the invention is the provision of a machine for stacking alternate core laminations of two different configurations comprising means for supporting stacks of laminations of each configuration, an assembly position and means for selecting laminations alternately from each stack for transferring the selected laminations to the assembly position. More particularly, the selecting means includes means for discharging laminations alternately from each stack, as a reciprocating double ended shuttle which ejects laminations alternately from the bottom of each of the stacks to an intermediate assembly position.

Another feature of the invention is that the machine includes means for fastening the laminations of an assembly stack together.

A further feature of the invention is that the machine includes a slide member movable transversely to the direction of reciprocation of the double ended shuttle to remove an assembled stack of laminations from the assembly position.

Yet another feature of the invention is the provision of a counter responsive to the number of laminations selected for actuating the slide and, in turn, the fastening means.

Further features and advantages of the invention will readily be apparent from the following specification and from the drawings, in which:

FIGURE 1 illustrates a double E core made of two sections with interleaved laminations;
FIGURE 2 is an exploded perspective of the core of FIGURE 1;
FIGURE 3 is a plan view of a core lamination of one configuration;
FIGURE 4 is a plan view of a core lamination of another configuration;
FIGURE 5 is an elevation of a stacking machine embodying the invention;
FIGURE 6 is a plan view of the machine of FIGURE 5;

FIGURE 7 is a section taken along line 7—7 of FIGURE 6;
FIGURE 8 is a view similar to FIGURE 7 showing the slide in its actuated position;
FIGURE 9 is a block diagram of a control for the machine of FIGURES 5 through 7; and
FIGURE 10 is a block diagram of a modified control for the machine.

Inductor devices, as transformers or chokes, have laminated iron cores which are generally in the form of a closed quadrilateral. More specifically, the configuration may be that of a square or rectangle or, where a center leg is utilized, E–I or double E. In some designs the abutting lamination ends are interleaved to reduce the reluctance of the flux path. Where interleaved ends are used, the laminations have different configurations, generally with alternate laminations in each stack of different configurations. The invention is illustrated herein in an apparatus for the assembly of a double E core, made up of two stacks each having alternate laminations of different configurations. Other core configurations might, of course, be used.

Turning now to the drawings, a double E core 15 is illustrated in FIGURES 1 through 4, made up of two E-shaped portions 16 and 17. Each of the portions 16 and 17 is identical and is composed of an odd number of E-shaped laminations in a stack and held together by rivets 18, 19. The ends of the legs of the E-shaped core members are interleaved providing minimum air gap and reluctance in the magnetic circuit. The E-shaped laminations in each of core portions 16 and 17 have two configurations, differing in the length of the legs of the E. Lamination 21, FIGURE 3, has short legs while lamination 22, FIGURE 4, has long legs. The two lamination stacks 16 and 17 are made up of alternate laminations of the two configurations. With an odd number of laminations in each core portion, the two portions are identical and may readily be assembled without sorting. Of course, the two portions may be made with even numbers of laminations, so long as they are properly sorted before final assembly into the completed core.

It has been the practice in manufacture of inductor cores of this type to assemble the core portions by hand, the assembler selecting alternate laminations from two bins or the like and stacking them in a suitable aligning guide. A hand assembly operation is expensive, tedious and, even with experienced labor, subject to a high rate of error, both in the number of laminations stacked and the order in which they are stacked. The automatic assembly apparatus of the present invention provides for stacking dissimilar laminations rapidly and accurately.

With particular reference to FIGURES 5 and 6, the apparatus includes a pair of spaced support members 25 and 26 which carry stacks 27, 28 of laminations. Laminations in stack 27 have the long leg configuration of lamination 22 while those in stack 28 are the short leg laminations 21. Extending upwardly from supports 25 and 26 are guide rails 29 and 30 which have a configuration matching that of the laminations carried thereon. As shown in FIGURE 7, the guide rails 29 and 30 are curved away from supports 25 and 26 so that a tall stack of laminations may be placed thereon, resting against the guide rail.

The two stack supports 25 and 26 are spaced apart a distance equal to the length of the laminations providing an assembly position 33 for laminations selected from the two stacks. A reciprocating shuttle 35 selects the laminations and transfers them to the assembly position. The shuttle includes a frame 36 having end portions 36a and 36b, one outside the end of each of the supports 25 and 26, joined by a yoke member 36c. The end members 36a and 36b carry shuttle plates 37 and 38 which extend inwardly from the ends of the yoke and have inner or facing edges 37a and 38a spaced apart a distance equal to the length of one lamination plus the spacing between the stack supports 25 and 26. The reciprocating motion of the shuttle carries it between end positions in which the facing edges 37a and 38a of shuttle plates 37 and 38 are just outside the outer edges of stacks 27 and 28. Shuttle plates 37 and 38 are substantially equal in thickness to the thickness of the individual laminations. As the shuttle reciprocates, laminations are alternately selected from the two stacks 27 and 28 and pushed inwardly to fall between supports 25 and 26 at assembly position 33. The fingers 29a and 30a of guide rails 29, 30 which extend between the legs of the E-shaped laminations, terminate above the upper surface of supports 25 and 26 by a distance equal to the lamination thickness so that the lowermost lamination in the stack may be ejected without moving the laminations above.

The shuttle may be reciprocated in a suitable manner. As illustrated herein, it is driven by a rotating disc 40 through an eccentric link 41. Each rotation of disc 40 causes a full cycle of travel of shuttle 35, selecting a lamination from each stack and transferring it to the assembly position. An automatic control of the number of laminations in each assembled core portion is provided, as will appear below. The automatic control is based on a counting means here illustrated as the counter 43, actuated by projections 44 on drive disc 40. As two laminations are selected each time the disc rotates, two projections 44 are provided, so that counter 43 records the true number of laminations selected. This is helpful in controlling the remainder of the apparatus where an odd number of laminations are stacked. If an even number of laminations is selected, a single projection may be used and the counter actuated once for each reciprocation of the shuttle.

A slide member 46 is located adjacent the assembly position 33 and has guide fingers 46a which extend into the spaces between the legs of the selected E-shaped laminations. Slide 46 is movable in a direction transverse to the direction of reciprocation of shuttle 35, to transfer an assembled stack of laminations from the assembly position 33 to a fastening position 48 at which a riveter 49 (shown diagrammatically in FIGURE 7) inserts a rivet through the holes in the laminations, securing them together. In the embodiment of the invention illustrated, the slide 46 is actuated by a pneumatic piston and cylinder 50 to move the assembled stack of laminations from assembly position 33 against an alignment plate 51 adjacent the fastening position 48 (FIGURE 8). Following the fastening operation the completed core portion is ejected from the fastening position by a piston and cylinder device 52 to a suitable receptacle, not shown, but which may be positioned to the right of the fastening position as seen in FIGURE 6.

During reciprocation of the transverse slide 46, shuttle 35 continues to operate selecting laminations from stacks 27 and 28. A supporting surface 55 on the slide moves into the space between supports 25 and 26 upon actuation of the slide, and is located above assembly position 33 but below the upper surface of supports 25 and 26. The laminations selected by the shuttle while the slide 46 is out of the position shown in FIGURE 6 drop on top of supporting surface 55. Upon retraction of the slide from the fastening position to the position of FIGURE 6, such laminations are pushed from the supporting surface by a fixed stop plate 56 and fall into the assembly position.

Summarizing the operation, as the shuttle reciprocates laminations are ejected alternately from the bottom of stacks 27 and 28 and transferred to assembly position 33. When the stack is completed, a piston and cylinder device 50 is actuated causing the slide 46 to move the stack to fastening position 48. Riveter 49 is actuated, fastening the stack of laminations together. Slide 46 is withdrawn and the completed stack ejected by piston and cylinder device 50.

Two suitable controls for the machine are shown in FIGURES 8 and 9, both responsive to counter 43. In the system of FIGURE 8, the counter actuates slide 46 (through piston and cylinder device 50) when the stack is completed. The slide moves the stack to the fastening position where it is detected by sensor 58. Riveter 49 is responsive to sensor 58 and, after the riveting operation is completed, causes slide 46 to retract and actuate ejector 50.

In the system of FIGURE 9, counter 43 actuates a control timer upon completion of the stack. The timer controls sequential operation of slide 46, riveter 49 and ejector 50.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A machine for stacking alternate core laminations of two different configurations, comprising: means for supporting a stack of laminations of one configuration; means for supporting a stack of laminations of another configuration; means defining an assembly position for a stack of laminations; a reciprocating shuttle mechanism for selecting laminations alternately from each stack and transferring them to the assembly position; a slide member movable transversely to the direction of reciprocation of the shuttle mechanism to remove and transfer an assembled stack of laminations from said assembly position to a fastening position spaced from said assembly position; and means at said fastening position for fastening the transferred stack of laminations together.

2. The machine of claim 1 wherein said slide member moves across said assembly position and has means defining a surface spaced above the assembly position to receive laminations selected by said shuttle mechanism.

3. The machine of claim 2 including a stop plate above the surface on said slide member to retain selected laminations at said assembly position.

4. The machine of claim 1 including a counter, responsive to the number of laminations selected, for actuating said slide member.

5. The machine of claim 1 including means responsive to operation of said fastening means to eject the completed stack of laminations.

References Cited

UNITED STATES PATENTS

| 1,762,017 | 6/1930 | Grenzer | 29—203 |
| 1,966,878 | 7/1934 | Bluzat | 29—203 |
| 2,494,349 | 1/1950 | Mittermaier | 29—203 |
| 3,136,043 | 1/1964 | Ruellan | 29—203 |

THOMAS H. EAGER, *Primary Examiner.*

U.S. Cl. X.R.

29—211